United States Patent Office 3,544,334
Patented Dec. 1, 1970

3,544,334
MULTICOLORED CAKE BATTER AND PROCESS
FOR MAKING SAME
Robert F. Kozlik, Minneapolis, Minn., assignor to
General Mills, Inc., a corporation of Delaware
No Drawing. Filed July 3, 1967, Ser. No. 650,629
Int. Cl. A21d 13/08
U.S. Cl. 99—92                                      4 Claims

ABSTRACT OF THE DISCLOSURE

A frozen cake batter which is made up of solidly frozen pieces of different colored batters which may be assembled in a baking container prior to baking so as to produce a three-dimensional, reproducible pattern in the baked cake.

---

The product of our invention is a novel cake batter capable of producing a unique and original cake. The cake batter is comprised of solidly frozen pieces of different colored batters capable of being assembled into a composite batter which may then be baked into a cake having a three-dimensional pattern. The pieces may be pre-assembled by the manufacturer in a baking container. The housewife then need only place the container in the oven and bake. As an alternative, an amount of batter containing a variety of colored, solidly frozen pieces may be packaged and sold to the consumer allowing the consumer to exercise her own creativity and ingenuity in making a uniquely colored and patterned cake.

The cake resulting from the product of our invention may be different than either a marble cake or a layer cake comprised of different colored layers. A marble cake results in a non-reproducible irregular pattern due to its method of production. A cake made from our invention can produce unique, unusual patterns which can be reproduced identically merely by aligning the same size and color pieces in the same way. Also the pieces of our invention may be shaped in any way prior to freezing producing three-dimensional configurations or even pictures. The multi-colored configuration here may be both horizontal and vertical, i.e., the pieces may be aligned to form a colored pattern across the horizontal plane of the cake, while a layer cake containing alternate layers of different colors only produce a simple vertical striation.

Any conventional cake better may be used for the production of our invention. By batter we mean a relatively fluid combination of leavening, water and a farinaceous material such as flour, commonly used in the production of cakes. Other ingredients commonly found in cakes such as eggs, shortening or sugar may be present in amounts adequate to produce the type of cake desired.

The only limitation on the batter is that it must be chemically leavened. Yeast leavened batters require thawing and proofing. When a chemically leavened batter is used, no thawing is necessary. Furthermore, if batter pieces are allowed to stay in a melted state for the time necessary to proof, the pieces will liquify and run together during the proofing stage and only an indistinct batter would be produced.

The batter itself may contain any of the commonly used cake flavoring materials such as nuts, chocolate and the like. Because the batter is frozen, the moisture containing flavor components such as fruit or fruit purees can also be used without spoilage and packaging problems inherent in trying to include these ingredients in a dry mix.

The solidly frozen pieces which make up the product of our invention should not be greater than 1½ inches in thickness. Pieces which are greater than 1½ inches produce a cake which is brown on the outside without being thoroughly baked in the center. Very thin pieces, those with a thickness of less than ¼ inch, tend to become fragile and are therefore difficult to work with, although they will tend to melt more rapidly and therefore take less time for baking. We prefer a range of thickness of about ¼ to 1¼ inches to avoid the problems encountered from relatively thick or thin pieces.

The process for making the cake batter of our invention consists of making a cake batter, using any commercially available mix or combining the ingredients based on a recipe, and freezing the batter into pieces not thicker than 1½ inches. The process is then repeated with a batter having a different color. The freezing of batter pieces from different colored batters may be repeated as often as desired to produce a wide color spectrum of component pieces available for the final batter. The components are combined to produce a multi-colored batter and then they may be aligned in such a way that the pattern desired in the final cake will be present in the batter as placed in the baking container. This assembly may be made by the manufacturer or the manufacturer may sell a mixture of various colored pieces, thereby allowing the consumer to create a patterned cake of her own design. If the latter alternative is used, there is no need to limit the amount of batter present, i.e., a package can be sold to the consumer containing batter for several cakes of various sizes.

EXAMPLE I

A tricolor checkerboard cake was made by combining frozen pieces of white, yellow and chocolate cake. The pieces were essentialy cubical and had identical dimensions. These dimensions were 1¼ x 1¼ x 1 inches.

The batters were prepared according to the following formulas and recipes:

(1) Silver White Cake

2¼ cup cake flour
1½ cup sugar
3½ tsp. baking powder
1 tsp. salt
½ cup soft shortening
1 cup milk
1 tsp. flavoring
4 egg whites (2) Golden Layer Cake 2¼ cup cake flour
1½ cup sugar
3 tsp. baking powder
1 tsp. salt
½ cup soft shortening
1 cup milk
1½ tsp. flavoring
2 eggs (3) New Fudge Cake 1¾ cup cake flour
2 cups sugar
2 tsp. baking powder
¼ tsp. soda
1 tsp. salt
¼ cup soft shortening
1½ cups milk
1 tsp. vanilla
2 eggs
4 squares of unsweetened chocolate (4 oz.) melted
1 cup chopped nuts The instructions for making the batters and the cakes were as follows:

Silver white cake.—Measure flour by dip-level-pour method or by sifting. Blend flour, sugar, baking powder and salt. Add shortening, ⅔ cup of milk and flavoring.

Beat 2 minutes, medium speed on mixer or 300 vigorous strokes by hand. Scrape sides and bottom of bowl constantly. Add rest of milk and egg whites. Beat 2 more minutes, scraping bowl frequently.

Golden layer cake.—Sift together flour, sugar, baking powder and salt. Add shortening, ⅔ cup of milk and flavoring. Beat 2 minutes medium speed on mixer or 300 vigorous strokes by hand. Scrape sides and bottom of bowl constantly. Add rest of milk and eggs. Beat 2 more minutes, scraping bowl frequently.

New fudge cake.—Measure flour by dip-level-pour method or by sifting. Blend flour, sugar, baking powder, soda and salt. Add shortening, milk and vanilla. Beat 2 min., medium speed on mixer or 300 vigorous strokes by hand. Scrape sides and bottom of bowl constantly. Add eggs and chocolate. Beat 2 more min., scraping bowl frequently. Stir in nuts.

After the batter was prepared it was frozen. The freezing of the batter was done by using a baker's sheet with a 1 inch covering of Dry Ice as a freezing platform and placing the molds on top of the ice. Aluminum foil was then placed on top of the molds and ground Dry Ice was sprinkled on the foil with the overall effect simulating a freezing tunnel. The pieces took about 14–16 minutes to freeze solidly. Except for the fudge cake batter which froze at 12–16 minutes.

The frozen pieces were subsequently aligned by placing different colors next to each other across the bottom of the pan. The frozen pieces were then baked at 350° for from 35–45 min. Variances in baking times are dependent on the size and shape of the container, the level of batter in the container and the oven. A delicious, uniquely colored cake resulted with horizontally aligned alternating squares across the surface.

EXAMPLE II

A cake was made using batters made from three commercially available mixes. The mixes used were Milk Chocolate, Cherry Chip and White Cake. The ingredients as listed on the package were:

Milk Chocolate

Sugar
Cake flour (bleached)
Shortening (with freshness preserver)
Corn syrup solids
Cocoa processed with alkali
Leavening
Nonfat dry milk
Propylene glycol monoester and mono- and diglycerides
Enzyme modified whole milk
Wheatstarch
Salt
Guar gum

Cherry Chip

Cake flour (bleached)
Sugar
Shortening (with freshness preserver)
Corn syrup solids
Nonfat dry milk
Leavening
Propylene glycol monoester and mono- and diglycerides
Wheat starch
Artificial flavor
Salt
Corn flakes
Guar gum
Soy lecithin
Cherry fruit and extract
Artificial colors

White Cake Mix

Sugar
Cake flour (bleached)
Shortening (with freshness preserver)
Nonfat dry milk
Leavening
Propylene glycol monoester and mono- and diglycerides
Wheat starch
Salt
Artificial flavor
Guar gum
Soy lechithin A batter was made separately from each cake mix according to the package directions which were essentially identical. (The only difference being that in the case of the white cake, 2 egg whites were used rather than whole eggs.) Each cake mix was blended with 1⅓ cups water, and 2 eggs. The mixture was beaten for 4 minutes at medium speed.

The batters were then separately frozen into pieces measuring 1¼ x 1¼ x 1. The pieces were then aligned as in Example I and baked. The resultant cake had a pattern identical to the cake made from the batter of Example I. The baked cherry pieces produced an attractive variety of shades of pink and red and the whole cake appeared, and indeed was, delectable.

The examples of our invention are designed to show that multi-colored cakes and cake batters may be made from recipes or commercial mixes. It is obvious that combinations of flavors and colors are virtually unlimited and freezing in molds can produce tremendous variations in patterns. Therefore, these examples are merely illustrative of the broad concept of our invention.

Now, therefore, I claim:

1. A packaged chemically leavened cake batter comprising: a plurality of discrete frozen batter pieces having a thickness of from ¼ inch to not greater than 1½ inches, said plurality of batter pieces comprising batter pieces of at least two different colors and being capable of arrangement in color designs and of being baked to form a reproducible color patterned continuous cake.

2. The packaged batter of claim 1 in which the discrete frozen batter pieces are aligned to form a colored pattern across a horizontal plane passing through said pieces.

3. A process for making a chemically leavened multi-colored cake which comprises: first, freezing a batter into at least one discrete piece not thicker than 1½ inches; second, repeating step 1 at least once with at least one batter having a color different from the batter used in forming the discrete piece in the first step; third, combining said pieces of batter of the first and second steps so that at least two colors are included in said combination; and fourth, baking said pieces of batter in said combination to form a continuous cake.

4. The process of claim 3 where the batter pieces are placed in a baking pan so that a three-dimensional, multi-colored pattern capable of being reproduced is formed in a horizontal plane passing through the batter pieces.

References Cited

UNITED STATES PATENTS 2,810,650   10/1957   Joslin _____ 99—92 XR

LIONEL M. SHAPIRO, Primary Examiner

J. R. HOFFMAN, Assistant Examiner

U.S. Cl. X.R.

99—192